United States Patent
Jang et al.

(10) Patent No.: US 11,989,125 B2
(45) Date of Patent: May 21, 2024

(54) STORAGE DEVICE AND OPERATING METHOD OF MEMORY CONTROLLER

(71) Applicant: Samsung Electronics Co., Ltd., Suwon-si (KR)

(72) Inventors: Sungmin Jang, Hwaseong-si (KR); Kibeen Jung, Incheon (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 296 days.

(21) Appl. No.: 17/060,737

(22) Filed: Oct. 1, 2020

(65) Prior Publication Data

US 2021/0248069 A1  Aug. 12, 2021

(30) Foreign Application Priority Data

Feb. 11, 2020  (KR) ........................ 10-2020-0016633

(51) Int. Cl.
*G06F 12/02* (2006.01)
*G06F 3/06* (2006.01)
*G06N 20/00* (2019.01)

(52) U.S. Cl.
CPC ........ *G06F 12/0253* (2013.01); *G06F 3/0604* (2013.01); *G06F 3/064* (2013.01); *G06F 3/0655* (2013.01); *G06N 20/00* (2019.01); *G06F 2212/7205* (2013.01)

(58) Field of Classification Search
CPC .... G06F 12/0253; G06F 3/0604; G06F 3/064; G06F 3/0655; G06F 2212/7205; G06N 20/00
USPC ........................................................ 707/813
See application file for complete search history.

(56) References Cited

U.S. PATENT DOCUMENTS

| | | | |
|---|---|---|---|
| 7,174,354 B2 | 2/2007 | Andreasson | |
| 10,185,656 B2 | 1/2019 | Kanno | |
| 10,229,050 B2 | 3/2019 | Choi et al. | |
| 10,496,330 B1* | 12/2019 | Bernat | G06F 3/064 |
| 10,963,175 B2* | 3/2021 | Lee | G06F 12/0246 |
| 2007/0086260 A1* | 4/2007 | Sinclair | G06F 12/0246 |
| | | | 711/E12.008 |
| 2014/0359197 A1 | 12/2014 | Franceschini et al. | |
| 2016/0267004 A1* | 9/2016 | Perlstein | G06F 12/0253 |

(Continued)

FOREIGN PATENT DOCUMENTS

| | | |
|---|---|---|
| JP | 2017120587 A | 7/2017 |
| KR | 101880190 B1 | 7/2018 |
| KR | 10-2018-0119473 A | 11/2018 |

OTHER PUBLICATIONS

Extended European Search Report dated Jul. 12, 2021 for corresponding EP Patent Application No. 21154109.9.

*Primary Examiner* — Hosain T Alam
*Assistant Examiner* — Saba Ahmed
(74) *Attorney, Agent, or Firm* — Muir Patent Law, PLLC

(57) ABSTRACT

A storage device includes a memory device including a plurality of memory blocks and a memory controller. The memory controller is configured to control a garbage collection operation of the memory device. The memory controller is also configured to select a victim block and a target block for performing the garbage collection operation among the plurality of memory blocks, according to state information of each of the plurality of memory blocks and feature information of data written in each of the plurality of memory blocks, by using a reinforcement learning model.

19 Claims, 18 Drawing Sheets

(56) References Cited

U.S. PATENT DOCUMENTS

| | | |
|---|---|---|
| 2018/0018091 A1 | 1/2018 | Shin et al. |
| 2018/0188975 A1* | 7/2018 | Benisty ................. G06F 3/0679 |
| 2018/0307598 A1* | 10/2018 | Fischer ................. G06F 3/0643 |
| 2019/0155520 A1* | 5/2019 | Gervais ................. G06F 3/0616 |
| 2019/0196965 A1* | 6/2019 | Zhang ................. G06F 16/1727 |
| 2020/0379904 A1* | 12/2020 | Davis ................. G06F 12/0253 |

* cited by examiner

FIG. 6

| Block Index | Stream Id | I/O Sequentiality | Performance | Valid Page Count |
|---|---|---|---|---|
| 0 | 0 | 3 | 1900 | 50 |
| 1 | 3 | 2.1 | 2200 | 10 |
| ... | ... | ... | ... | ... |
| M | 7 | 7.6 | 2300 | 250 |

| Block Index | Data Life Time | Block Life Time | Block Open Time | Free block count |
|---|---|---|---|---|
| 0 | 100 | 200 | 25 | 5 |
| 1 | 2100 | 1100 | 15 | 20 |
| ... | ... | ... | ... | ... |
| M | 300 | 4000 | 4 | 10 |

| Block Index | Stream Id | Data Life Time | Block Life Time | Block Open Time | I/O Sequentiality | Performance | Valid Page Count | Free block count |
|---|---|---|---|---|---|---|---|---|
| 0 | 0 | 100 | 200 | 25 | 3 | 1900 | 50 | 5 |
| 1 | 3 | 2100 | 1100 | 15 | 2.1 | 2200 | 10 | 20 |
| ... | ... | ... | ... | ... | ... | ... | ... | ... |
| M | 7 | 300 | 4000 | 4 | 7.6 | 2300 | 250 | 10 |

T3

STORAGE DEVICE AND OPERATING METHOD OF MEMORY CONTROLLER

CROSS-REFERENCE TO RELATED APPLICATION

This application claims the benefit of Korean Patent Application No. 10-2020-0016633, filed on Feb. 11, 2020, in the Korean Intellectual Property Office, the disclosure of which is incorporated herein in its entirety by reference.

BACKGROUND

The inventive concept relates to a storage device, and more particularly, to a storage device including a memory device and a memory controller and an operating method of the memory controller.

A storage device, such as a solid state drive (SSD), a non-volatile memory express (NVMe), an embedded multimedia card (eMMC), and universal flash storage (UFS), using a nonvolatile memory device is widely used.

As data is continuously written to flash memory, valid data may be scattered throughout the flash memory. Therefore, in order to secure a free memory block in which data may be written, it is necessary to perform garbage collection that moves valid pages of at least one memory block to another memory block and performs an erase operation on the memory block.

Data having various characteristics may be in a block of a memory device, and thus, garbage collection efficiency may decrease. In addition, an increase in the performing instances of the garbage collection, may decrease the life time of the storage device.

SUMMARY

The inventive concept provides a storage device that efficiently performs garbage collection. In addition, the inventive concept provides an operating method of a memory controller that efficiently performs the garbage collection.

According to an aspect of the inventive concept, there is provided a storage device including: a memory device including a plurality of memory blocks; and a memory controller configured to control a garbage collection operation of the memory device and select a victim block and a target block for performing the garbage collection operation among the plurality of memory blocks, according to state information of each of the plurality of memory blocks and feature information of data written in each of the plurality of memory blocks, by using a reinforcement learning model.

According to an aspect of the inventive concept, there is provided a storage device including: a memory device including a plurality of memory blocks; a memory controller configured to control the memory device and perform garbage collection by performing reinforcement learning based on first information indicating a state of the memory device before writing data and second information indicating a state of the memory device after writing data; a host interface for interfacing between a host and the memory controller; and a flash interface for interfacing between the memory controller and the memory device.

According to an aspect of the inventive concept, there is provided an operating method of memory controller, the operating method including: receiving write data; establishing a policy as a result of performing reinforcement learning based on state information of a memory device; and rearranging a plurality of memory blocks of the memory device based on the policy.

BRIEF DESCRIPTION OF THE DRAWINGS

Embodiments of the inventive concept will be more clearly understood from the following detailed description taken in conjunction with the accompanying drawings in which:

FIGS. 6, 7 and 8 are tables of data to be input to a garbage collection (GC) policy generator according to an example embodiment of the inventive concept;

DETAILED DESCRIPTION OF THE EMBODIMENTS

Figure 1:
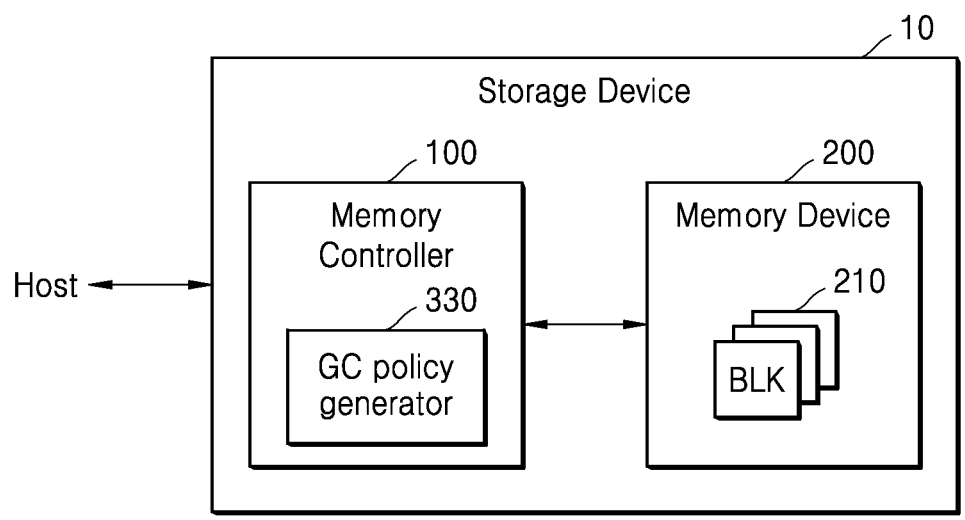
FIG. 1 is a block diagram illustrating a storage device according to an example embodiment of the inventive concept.

Hereinafter, embodiments of the inventive concept will be described in detail with reference to the accompanying drawings. FIG. 1 is a block diagram illustrating a storage device according to an example embodiment of the inventive concept.

FIG. 1 is referenced. A storage device 10 may store data. According to an example embodiment of the inventive concept, the storage device 10 may classify features of data to be stored and rearrange the stored data based on the classified data. The storage device 10 may establish a policy for rearranging the classified data. The storage device 10 may store data located in different storage areas and have similar characteristics among data classified based on the established policies, in adjacent data storage areas. The storage area may refer to a logical or physical storage space inside the storage device 10 such as a sector, a page, or a block.

In an example embodiment, the storage device 10 may include an embedded memory embedded in a storage system. In an example embodiment, the storage device 10 may include an embedded multi-media card (eMMC) or an embedded universal flash storage (UFS) memory device. In an example embodiment, the storage device 10 may include an external memory detachable from the storage system. For example, the storage device 10 may include a universal flash storage (UFS) memory card, a compact flash (CF) memory, a secure digital (SD) memory, a micro secure digital (Micro-SD) memory, a mini secure digital (Mini-SD) memory, an extreme digital (xD) memory or a memory stick, but is not limited thereto.

The storage device 10 may include a memory controller 100 and a memory device 200. The memory controller 100 may include a garbage collection (GC) policy generator 330, and the memory device 200 may include a plurality of memory blocks BLK 210.

The memory controller 100 may control operation of the storage device 10. For example, the memory controller 100 may control the memory device 200 to read data stored in the memory device 200 or program data in the memory device 200 in response to a read request or a write request from a host. In an example embodiment, the memory controller 100 may provide an address, a command, and a control signal to the memory device 200, thereby controlling programming, reading, and erasing operations performed on the memory device 200. Further, programming data for the memory device 200 according to a request from the host and read data may be transmitted and received between the memory controller 100 and the memory device 200.

The GC policy generator 330 may establish a policy for rearranging the memory block BLK 210 of the memory device 200 based on characteristics of data to be stored in the memory device 200. Hereinafter, characteristics of data to be stored in the memory device 200 is referred to as state information. In an example embodiment, the state information may include a state of the memory block BLK included in the memory device 200, for example, such as the number of valid pages among pages of the plurality of memory blocks BLKs, the performance of the memory device, an expected life time of the plurality of memory blocks BLKs, and an elapsed time of erasing the plurality of memory blocks BLKs, but is not limited thereto.

According to an example embodiment, the GC policy generator 330 may establish a policy for rearranging the memory block 210 based on the characteristics of the input data. Hereinafter, the characteristics of data to be written in the memory device 200 may be referred to as feature information.

The GC policy generator 330 may establish a policy through reinforcement learning.

Reinforcement learning is an area of machine learning in which the software/machine, through trial and error, takes suitable action to maximize reward in a particular situation. In reinforcement learning, the software/machine learns through experience. For example, the reinforcement learning may establish a policy so that reward is maximized by rewarding on actions according to a given state. The goal of reinforcement learning may be to establish a policy to receive maximum reward.

In an example embodiment, the GC policy generator 330, through reinforcement learning, may determine a policy based on the state information of the memory device 200 and/or the feature information of data input from the host. The process of determining the policy by the GC policy generator 330 will be described in detail with reference to FIG. 3.

The memory device 200 may include a nonvolatile memory device. In an example embodiment, the memory device 200 may include a device to which various types of memory are applied, such as NAND-type flash memory, magnetic RAM (MRAM), spin-transfer torque MRAM, conductive bridging RAM (CBRAM), ferroelectric RAM (FeRAM), phase RAM (PRAM), resistive RAM (RRAM), nanotube RAM, polymer RAM (PoRAM), nano floating gate memory (NFGM), holographic memory, molecular electronics memory, or insulator resistance change memory.

In an example embodiment, the memory device 200 may include a flash memory, and the flash memory may include a 2D NAND memory array or a 3D (or vertical) NAND (VNAND) memory array. The 3D memory array may be a circuit associated with operations of memory cells, or arrays of memory cells, having an active area disposed on a silicon substrate.

The 3D memory array may be formed monolithically on or within at least one physical level of circuits formed in the substrate. The term "monolithic" may mean that layers of each level constituting the arrays are stacked directly on layers of each lower level of the arrays. In one embodiment, the 3D memory array may include vertical NAND strings arranged in a vertical direction such that at least one memory cell is arranged over another memory cell. The at least one memory cell may include a charge trap layer. U.S. Pat. Nos. 7,679,133, 8,553,466, 8,654,587, 8,559,235, and U.S. Patent Application Publication No. 2011/0233648 disclose detailed configurations suitable for a 3D memory array composed of a plurality of levels, in which word lines and/or bit lines are shared between the levels, the disclosures of which are incorporated herein in their entirety by reference.

The memory device 200 may include a plurality of memory block (BLK)(210)s. Each of the plurality of memory blocks 210 may include at least one page, and each page may include a plurality of memory cells to which a plurality of word lines are connected. In an example embodiment, the memory device 200 may include a plurality of planes including the plurality of memory blocks 210, and in particular may include a plurality of memory dies each including a plurality of planes.

The memory device 200 may include a single level cell (SLC) storing 1-bit data or a multi-level cell (MLC) storing multi-bit data (e.g., 2 or more bits). For example, the memory device 200 may include a triple level cell (TLC) capable of storing 3-bit data, or a quadruple level cell (QLC) capable of storing 4-bit data, and also may include a memory cell capable of storing 5 or more bits of data.

In an example embodiment, the host may provide a command to the storage device 10 and receive data from the storage device 10. In an example embodiment, the host may provide a write command and write data to the storage device 10. In an example embodiment, the host may transmit a read command to the storage device 10 and receive read data from the storage device 10. Data provided from the host may have various characteristics.

The host may include at least one or more processor cores, or may be implemented as a system on a chip. For example, the host may include a universal processor and a dedicated processor. The host may be the processor itself, or may correspond to an electronic device or a system including the processor. In an example embodiment, the host may correspond to a central processing unit (CPU), a microprocessor, or an application processor (AP), and the like.

The host and the memory device 200 may transmit and receive data to and from each other, that is, interface with each other, according to a predetermined standard. As examples of an interface for communication between the storage device 10 and the host, various interface methods, such as advanced technology attachment (ATA), serial ATA (SATA), external SATA (e-SATA), small computer small interface (SCSI), serial attached SCSI (SAS), parallel advanced technology attachment (PATA), peripheral component interconnection (PCI), PCI-express (PCI-E), IEEE 1394, universal serial bus (USB), secure digital (SD) card, multi-media card (MMC), embedded multi-media card (eMMC), compact flash (CF) card interface, enhanced small disk interface (ESD), integrated drive electronics (IDE), and mobile industry processor interface (MIPI), may be applied, but are not limited thereto.

The memory controller 100 and the memory device 200 may transmit and receive command, address, and data through one or more channels. The channel through which the command transferred from the host will be delivered and the storage area of the memory device the command will be executed may be determined by a logical address or a logical block address (LBA) transferred from the host.

Figure 2:
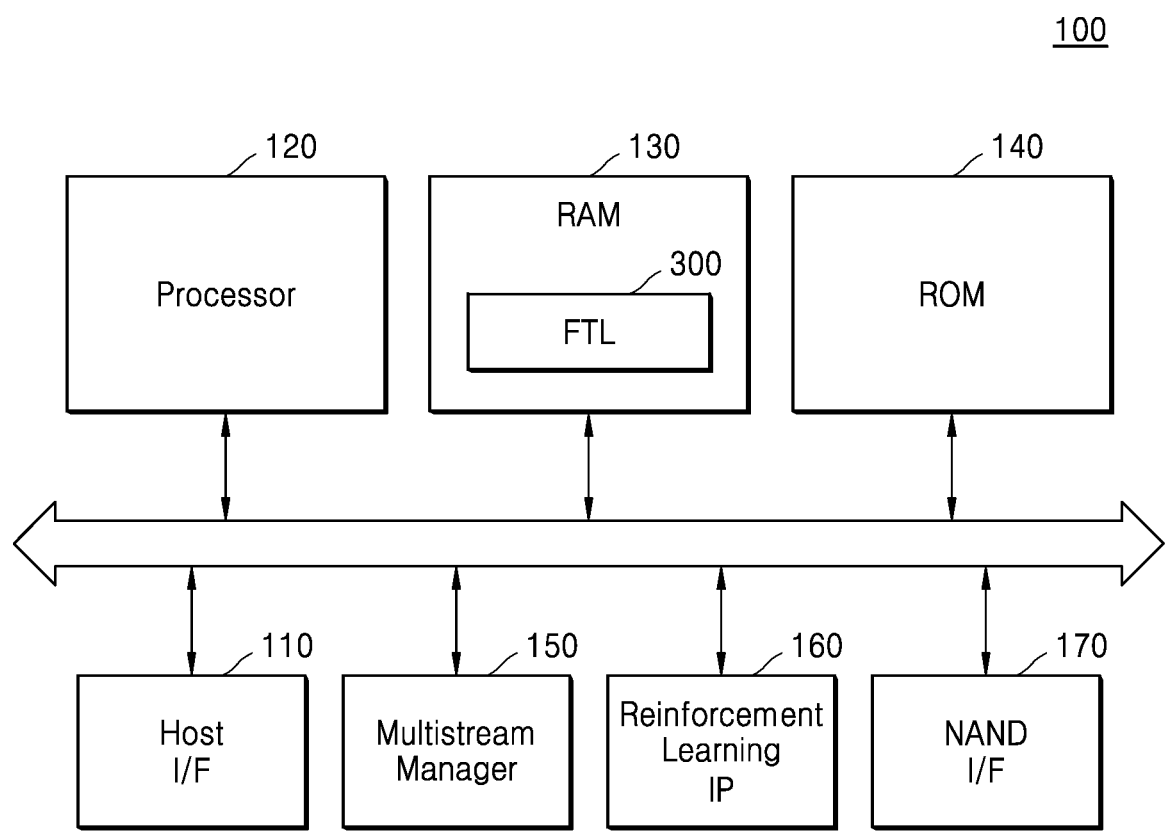
FIG. 2 is a block diagram illustrating a memory controller according to an example embodiment of the inventive concept.

FIG. 2 is a block diagram illustrating a memory controller according to an example embodiment of the inventive concept. FIGS. 1 and 2 are referenced together below for clarity.

The memory controller 100 may receive the command provided from the host, and the memory controller 100 may access the memory device 200 in FIG. 1 in response to the command. In more detail, the memory controller 100 may control read, program, and erase operations of the memory device 200 in response to the command input from the host. The command may include a read request, a write request, and the like. According to the write request from the host, the memory controller 100 may control signals to program data directly in the memory device 200, or may control signals to program data thereof after erasing data that has already been programmed.

The memory controller 100 may include a host interface 110, a processor 120, random access memory (RAM) 130, read only memory (ROM) 140, a multistream manager 150, a reinforcement learning intellectual property (IP) 160, and a NAND interface (NAND I/F) 170. The host interface 110, the processor 120, the RAM 130, the ROM 140, the multistream manager 150, the reinforcement learning IP 160, and the NAND interface 170 may be electrically connected through a bus. The bus may refer to a transmission path that transmits information between components of the memory controller 100. The memory controller 100 may further include other components.

The host interface 110 may include a data exchange protocol between the host and the memory controller 100. Accordingly, various devices may be connected to the host interface 110 as the host. In an example embodiment, the host interface 110 may interface with the memory controller 100 in response to a bus format of the host. The bus format of the host may include USB, SCSI, PCI express, ATA, PATA, SATA, and SAS, and the like. In an example embodiment, a non-volatile memory express (NVMe) protocol, compatible with the host device 20 exchanging data by the PCI express method, may be applied to the host interface 110.

The processor 120 may control all operations of the storage device 10 in FIG. 1. Specifically, the processor 120 may control the storage device 10 in FIG. 1 to decode the command received from the host and perform an operation according to a decoded result.

The processor 120 may provide the read command and the address to the memory device 200 in FIG. 1 in the read operation in response to the read request, and may provide the write command, the address, and the write data to the memory device 200 in FIG. 1 in the write operation in response to the write request.

The processor 120 may perform a process of converting the logical address received from the host into a physical page address by using meta data stored in the memory controller 100. Herein, the meta data may be understood as management information generated in the storage device 10 in FIG. 1 to manage the memory device 200 in FIG. 1. The meta data may include mapping table information which is used to convert the logical address to the physical page address of a flash memory, and also include information for managing a storage space of the memory device 200 in FIG. 1.

More specifically, the processor 120 may perform the process of converting the logical address received with the read/write request from the host into the physical address for the read/write operation in the memory device 200 in FIG. 1. The process of converting the logical address into the physical address may be performed in a flash translation layer (FTL). The processor 120 may execute firmware loaded in the ROM 140, thereby performing garbage collection or address mapping, and wear leveling, or the like, for managing the memory device 200 in FIG. 1 in an FTL 300.

The RAM 130 may temporarily store data transmitted from the host, data generated by the processor 120, or data read from the memory device 200 in FIG. 1. In the RAM 130, software or firmware for the operation of the storage device may be loaded from the ROM 140. In addition, meta data read from the memory device 200 in FIG. 1 may be stored in the RAM 130. The RAM 130 may include dynamic RAM (DRAM), static RAM (SRAM), or the like.

The RAM 130 may include the FTL 300. The FTL 300 may include a configuration capable of mapping each address between a file system and the memory device. In an example embodiment, the FTL 300 may convert a logical block address (hereinafter, referred to as LBA) of the host into a physical block address (hereinafter, referred to as PBA) of the memory device 200. The FTL 300 will be described in detail with reference to FIG. 3.

The ROM 140 may be read-only memory that stores the program to be executed by the processor 120. A program that may realize an operating method of the memory controller 100 or the firmware, in which the program may be recorded, may be stored in the ROM 140.

The multistream manager 150 may classify the write data transmitted from the host into a plurality of physical streams based on the characteristics of the write data and the state information of the memory device 200 in FIG. 1. Streams may be classified into a sequential stream, a random stream, and the like according to access type of the memory. The characteristics of data according to multistream will be described in detail with reference to FIG. 13. The reinforcement learning IP 160 may include one or more processors to accelerate arithmetic operations to be performed by models of a neural network. In an example embodiment, the reinforcement learning IP 160 may include a separate memory for storing programs (e.g., application) corresponding to models of the neural network. For example, the processor included in the reinforcement learning IP 160 may correspond to a neural network processing unit (NPU), and may include a fixed function engine for executing a convolution layer and a programmable layer for executing a non-convolutional layer. As another example, the processor included in the reinforcement learning IP 160 may include at least one of a graphical processing unit (GPU) for high-speed parallel processing and a tensor processing unit (TPU), based on an application specific integrated circuit (ASIC) for parallel processing of vector and matrix operations. According to various embodiments, the reinforcement learning IP 160 may be referred to as various terms including a neural network processing device, a neural network integrated circuit, a neuromorphic computing unit, or a deep learning device.

According to an example embodiment of the inventive concept, the reinforcement learning IP 160 may perform reinforcement learning on the characteristics of write data input from the host and state information of the memory device 200 in FIG. 1. The reinforcement learning IP 160 may process information related to the FTL 300 and reinforcement learning, and provide the processed information back to the FTL 300.

According to example embodiments, the reinforcement learning IP 160 may be referred to as various terms including the neural network processing device, the neural network integrated circuit, the neuromorphic computing unit, or the deep learning device. In FIG. 2, the reinforcement learning IP 160 is illustrated as being included in the memory controller 100, but according to embodiments, the reinforcement learning IP 160 may be separately provided outside the memory controller 100.

The NAND interface 170 may be configured to control signals for driving the memory device 200 in FIG. 1, and access the memory device 200 under control by the processor 120. The NAND interface 170 may be configured to selectively perform software and hardware interleaved operations through at least one channel.

Figure 3:
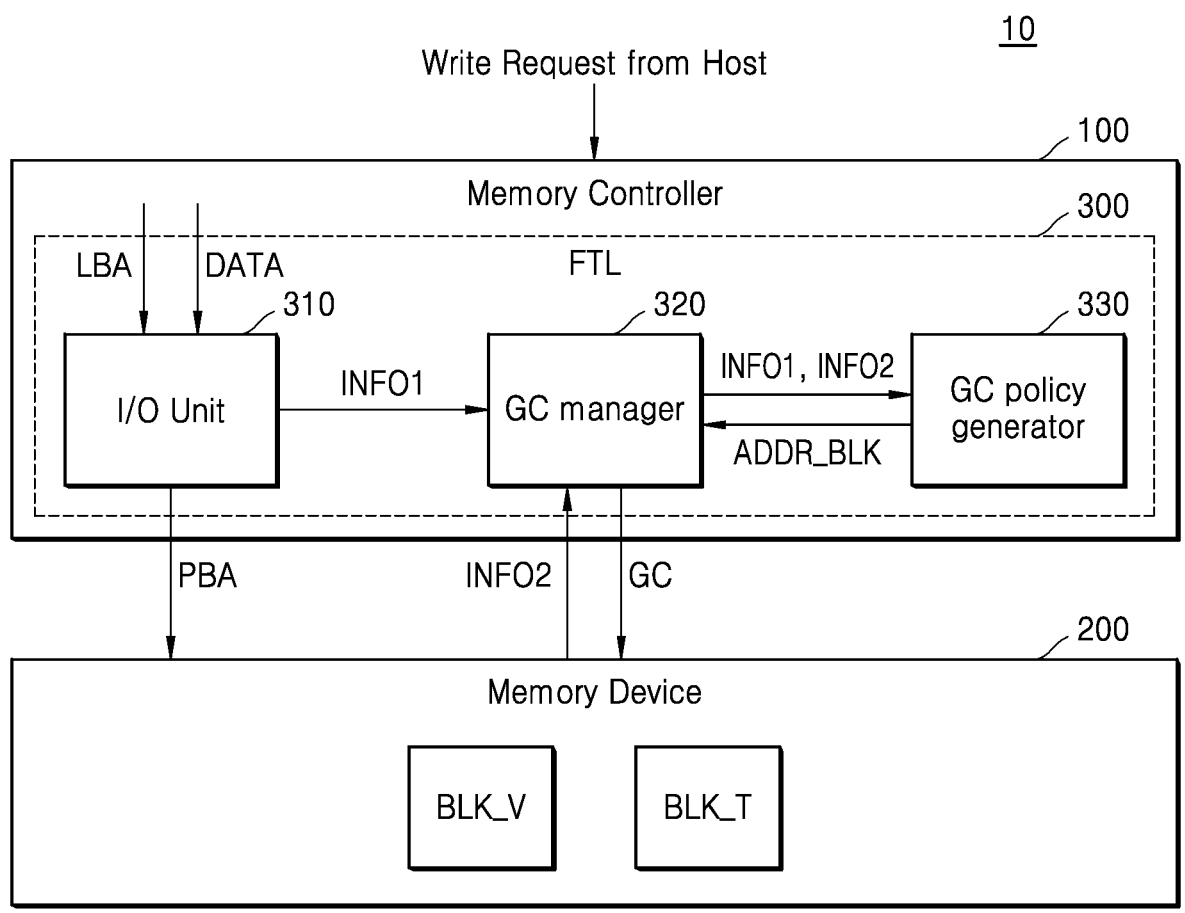
FIG. 3 is a block diagram illustrating a storage device according to an example embodiment of the inventive concept.

FIG. 3 is a block diagram illustrating a storage device according to an example embodiment of the inventive concept.

Hereinafter, the memory device 200 will be described as a flash memory device (i.e., a non-volatile memory device). As described above, the memory controller 100 may include the FTL 300. The FTL 300 may provide interfacing for hiding an erase operation of the memory device 200 between the file system of the host and the memory device 200. The FTL 300 may also minimize disadvantages of the memory device 200 such as erase-before-write and mismatch between an erase unit and a write unit and a disadvantage, in which there is a maximum number of erasures of the flash memory. By executing at least a portion of the FTL 300 by the processor 120 in FIG. 2, the following operation by the FTL 300 may be performed. In an example embodiment, the GC policy generator 330 may be executed by the reinforcement learning IP 160 in FIG. 2.

In the FTL 300, mapping that allocates the logical address LBA generated by the file system to the physical address PBA of the memory device 200 during the write operation of the memory device 200 may be performed. By the FTL 300, the number of writes per block of the memory device 200 may be counted, and wear leveling may be performed to distribute the degree of writes between the plurality of blocks so as to be equal. In addition, by the FTL 300, the garbage collection may be performed to rearrange data in order to limit an increase of invalid areas (i.e., garbage) due to repeated write/erase of data in the storage area. According to an example embodiment of the inventive concept, the garbage collection may be performed on the memory device 200 through data reprocessing with respect to the characteristics of write data, the state information of the memory device 200, and the types of stream, and thus, an invalid area may be converted into a valid area.

The FTL 300 may include an input/output unit 310, a garbage collection manager 320, and the GC policy generator 330. The FTL 300, the input/output unit 310, the garbage collection manager 320, and the GC policy generator 330 may be implemented using hardware, firmware, and/or software.

The input/output unit 310 may receive write data DATA and the logical address LBA of the write data in response to the write request from the host, and may provide the physical address PBA with respect to the logical address LBA to the memory device 200 based on the mapping table stored in the RAM 130 or the ROM 140 of FIG. 2. Further, the input/output unit 310 may process the write data DATA. The processed information may be processed in block units.

According to an example embodiment of the inventive concept, the input/output unit 310 may generate information on characteristics of the data by processing data (for example, a data stream) continuously received from the host. In an example embodiment, the information on characteristics of data may be classified into the feature information on characteristics of the write data DATA and the state information on the state of memory device 200. In an example embodiment, the information on the characteristics of data may be classified into first information INFO1, which is a characteristic before being written to the memory device 200, and second information INFO2, which is a characteristic after being written to the memory device 200.

The state information may include at least one of the number of valid pages among the pages of the plurality of memory blocks, the performance of the memory device, the expected life time of the plurality of memory blocks, and the erase elapsed time of the plurality of memory blocks, and the feature information may include at least one of the expected life time of data input from the host, continuity of data input from the host, and multistream identifiers (IDs) assigned according to the use frequency of the data, but is not limited thereto.

The input/output unit 310 may generate the first information INFO1 based on the state information before data is written to the memory device 200 and/or the feature information of the write data DATA. The memory device 200 may generate the second information INFO2 based on, the state information of the memory device 200 changed according to writing of the write data DATA and/or the feature information of the write data DATA. As used herein, the term "and/or" includes any and all combinations of one or more of the associated listed items and may be abbreviated as "/".

The first information INFO1 may be related to characteristics of the write data DATA to be written to the memory device 200, such as data life time, performance, and continuity. In an example embodiment, the first information INFO1 may include a stream identifier (Stream ID), I/O sequentiality, performance, and valid page count (VPC). The second information INFO2 may include expected data life time, expected block life time, block open time, free block count, and the like, but is not limited thereto.

The state information and the feature information, or the first information and the second information may be classified based on different standards of data sets. The state information, the feature information, the first information INFO1, and the second information INFO2 may be related to the life time of the input data.

The memory device 200 may perform the write operation that writes the write data DATA in the storage spaces (e.g., a plurality of non-volatile memories NVM 1 to NVM n) (n is a natural number of 2 or more)) according to the physical address PBA received from the input/output unit 310. As the write data DATA is written in the storage spaces, the state information of the memory device 200 may be different than before the write data DATA is written.

The GC manager 320 may receive the first information INFO1 from the input/output unit 310 and may receive the second information INFO2 from the memory device 200. In addition, the GC manager 320 may provide the first information INFO1 and the second information INFO2 to the GC policy generator 330, and as a result, may receive addresses ADDR_BLK on a victim block BLK_V and a target block BLK_T. The GC manager 320 may continuously count the number of free blocks from the state information of the memory device 200 as data is continuously written, and may rearrange the memory blocks BLK of the memory device 200 when the number of free blocks is less than a threshold value.

The GC policy generator 330 may perform the reinforcement learning by using the first information INFO1 and the second information INFO2, and as a result, may select the victim block BLK_V and the target block BLK_T determined to be suitable for performing the garbage collection operation. According to an example embodiment, the GC policy generator 330 may perform the reinforcement learning based on the state information and the feature information.

According to an example embodiment of the inventive concept, the GC manager 320 may provide a garbage collection signal GC for the victim block BLK_V to the memory device 200, based on the address ADDR_BLK for the victim block BLK_V and the target block BLK_T. The memory device 200 may copy data stored in the valid page in the victim block BLK_V to a free page in the target block BLK_T, and may erase the victim block BLK_V. That is, the memory blocks BLK may be rearranged in different ways.

The reinforcement learning to be performed in the GC policy generator 330 may be achieved by statistical learning as a kind of machine learning. As discussed above, the reinforcement learning may be a learning method that selects an action that maximizes an expected value of reward assigned to the state, which is given input data. In various embodiments, the reinforcement learning may refer to a machine learning method of learning what action is best to take in the current state. Whenever the action is taken, the reward may be given from the external environment, and thus the learning may progress in a direction of maximizing such reward. In the reinforcement learning, in order to select the action so that the total sum of expected values including values to be obtained later is maximized, even if the current expected value is a little, the learning may progress in the direction of maximizing the reward based on a discount rate in which expected values to be obtained in the future are converted into the present value thereof.

In an example embodiment, the GC policy generator 330 may take the first information INFO1 and the second information INFO2 as input data, learn the policy based on the input data, and output expected values with respect to the received input data based on the learned policy. For example, the GC policy generator 330 may extract the changed state information that is changed according to the characteristics of the write data DATA from the first information INFO1 and the second information INFO2, the state information of the memory device 200, and the written write data DATA, and thus may output a plurality of expected values based on the extracted information. In an example embodiment, the GC policy generator 330 may take the state information and the feature information as input data, learn the policy based on the input data, and output expected values with respect to the received input data based on the learned policy.

The GC policy generator 330 may output the victim block BLK_V and the target block BLK_T as expected values. In an example embodiment, the victim block BLK_V and the target block BLK_T may be respectively selected from a plurality of candidate victim blocks and a plurality of candidate target blocks. The victim block BLK_V and the target block BLK_T may include a single block, but a plurality of blocks may be selected as needed.

The GC policy generator 330 may generate the policy to select the optimal victim block (BLK_V) and target block (BLK_T) through interacting with the storage device 10. The policy may be a method for selecting one action that may maximize the reward, among a plurality of actions corresponding to the current state. In an example embodiment, policy information may be referred to as a quality (Q) function. In an example embodiment, the reward may be based on a write amplification factor (WAF).

According to various embodiments, the policy may be updated. The GC policy generator 330 may learn the policy for training based on an input data set, and the newly learned policy may replace the previous policy. The policy may be generated by performing directly the reinforcement learning in the GC policy generator 330, or may be generated by being processed in the reinforcement learning IP 160 of the memory controller 100 and receiving result thereof.

For the reinforcement learning, various types of network models such as a convolution neural network (CNN), such as GoogleNet, AlexNet, VGG Network, region with convolution neural network (R-CNN), region proposal network (RPN), recurrent neural network (RNN), stacking-based deep neural network (S-DNN), state-space dynamic neural network (S-SDNN), deep belief network (DBN), restricted Boltzmann machine (RBM), fully convolutional network, long short-term memory (LSTM) Network, Classification Network, deep Q-network (DQN), Double DQN, Dueling DQN, Distribution Reinforcement Learning, Multi-Step Learning, prioritized experience replay (PER), Noisy DQN, Categorical DQN, Rainbow DQN, decentralized policy network (DPN), deep decentralized policy network (DDPN), Model-based Learning, Monte Carlo, SARSA, Policy Search, Actor-Critic, and A3C, may be applied, but are not limited thereto. The method in which the GC policy generator 330 generates the policy will be described in detail with reference to FIGS. 6 to 12.

The garbage collection may be performed by selecting a block having the minimum valid page count (minimum VPC) and arranging valid pages into one block. The garbage collection based on the minimum valid page count (minimum VPC) may be performed regardless of the characteristics of data. Accordingly, when cold blocks in which data is not frequently changed are widely distributed in the storage area of the memory device 200, the garbage collection may be performed repeatedly. Because the memory device 200 may be limited in the number of writes due to the physical characteristics of storing electrons in a transistor in the memory cell to store data, the life time of the memory device 200 may be deteriorated when the garbage collection is repeatedly performed.

According to aspects of the inventive concept, the reinforcement learning may be performed based on at least one of the input data DATA and the state information of the memory device 200, and according to the result thereof, the victim block BLK_V and the target block BLK_T suitable for performing the garbage collection may be determined. Therefore, in the storage device according to the inventive concept, the number of garbage collections performed may be reduced by performing the garbage collection on the optimized victim block BLK_V and target block BLK_T, and as a result, a write amplification factor (WAF) may be reduced. Accordingly, the life time or the performance of the storage device 10 including the memory device 200 may be improved. Further, it may be expected that the performance of the write operation of the storage device is improved and the life time is extended. Hereinafter, WAF may be calculated based on a ratio of data requested by the host to data actually written to the memory device.

Figure 4:
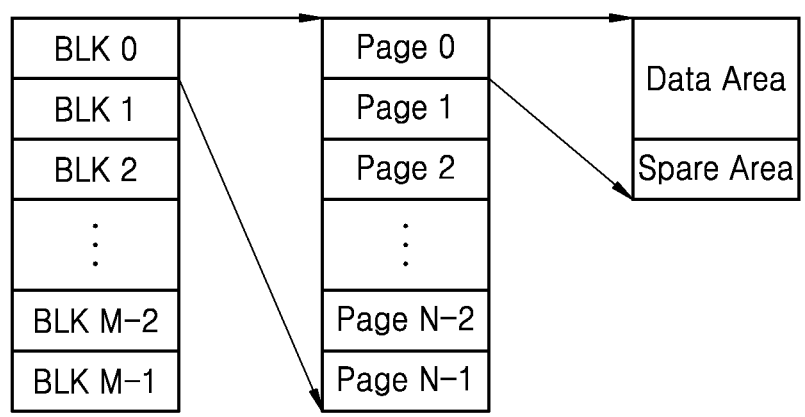
FIG. 4 is a conceptual diagram illustrating a structure of data to be stored in a memory device according to an example embodiment of the inventive concept.

FIG. 4 is a conceptual diagram illustrating a structure of data to be stored in a memory device according to an example embodiment of the inventive concept. FIGS. 3 and 4 are referenced together below for clarity.

The memory device 200 in FIG. 3 may include a plurality of memory blocks BLK 210. Each of the plurality of memory blocks may include at least one page, and each page may include a plurality of memory cells to which a plurality of word lines are connected. The memory cells may include at least one transistor, and the transistor may store data by storing electrons.

The memory device 200 in FIG. 3 may include at least one memory block BLK. For example, the memory device 200 may include M memory blocks, that is, a first to Mth memory blocks (BLK 0 to BLK M−1) (herein, M are natural numbers). In the storage device 10 in FIG. 3, the read and write operations may be performed in page (or sector) unit, but the erase operation may be performed in block units.

One memory block BLK may include N pages, for example, first to Nth pages (Page 0 to Page N−1). The write data DATA input to the storage device 10 in FIG. 3 may be stored in the valid page or the free page that exists in one of the at least one memory block BLK of the memory device 200 in FIG. 3.

One page may be divided into a data area in which data is stored and a spare area in which data is not stored. In an example embodiment, 2 KB (kilo-byte) may be allocated to the data area and 64B (byte) may be allocated to the spare area, but is not limited thereto.

Figure 5:
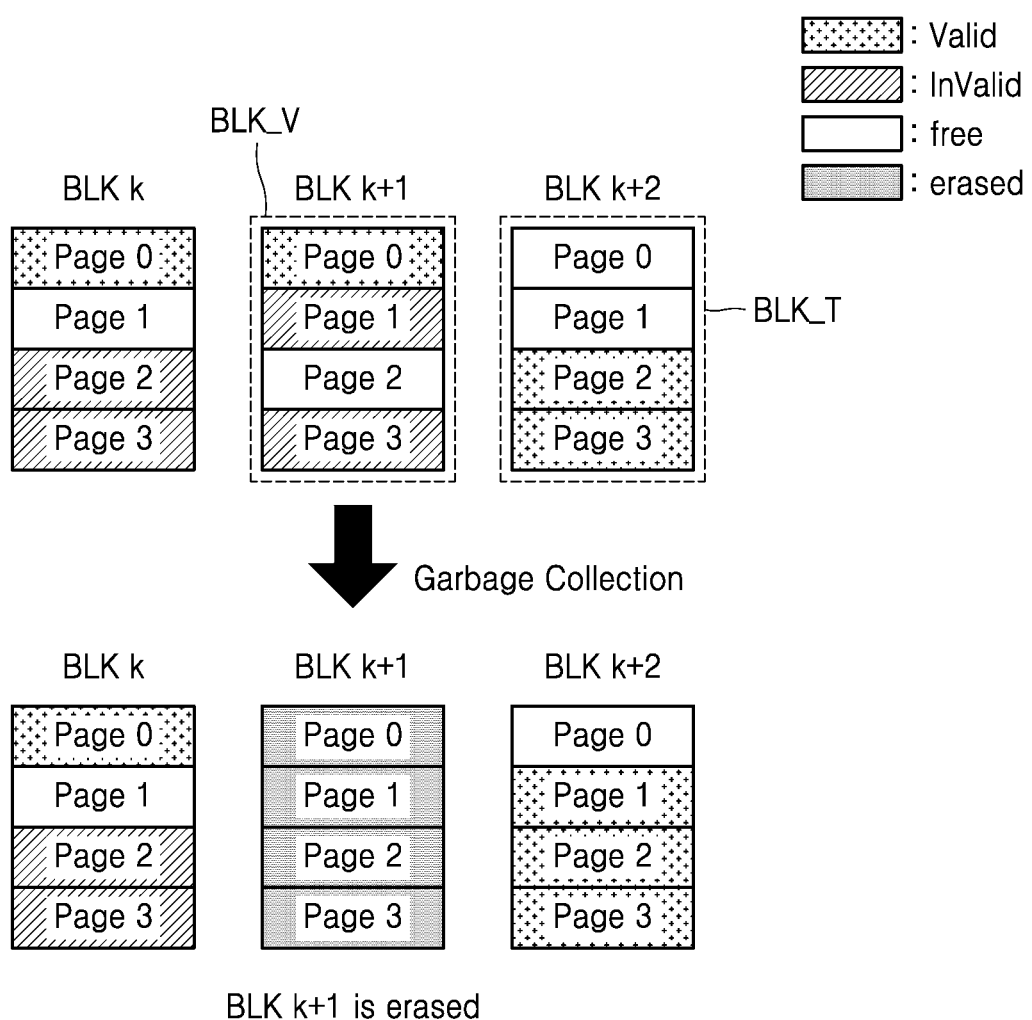
FIG. 5 is a conceptual diagram illustrating garbage collection to be performed in a memory device according to an example embodiment of the inventive concept.

FIG. 5 is a conceptual diagram illustrating garbage collection to be performed in a memory device according to an example embodiment of the inventive concept. FIGS. 3 and 5 are referenced together below for clarity.

For convenience of explanation, assume that four pages (Page 0 to Page 3) for the kth to (k+2)th memory blocks (BLK k to BLK k+2, k are arbitrary natural numbers) in the storage area of the memory device 200 in FIGS. 3 and 200 exist, respectively. The kth to (k+2)th memory blocks BLK k to BLK k+2 in FIG. 5 may be a portion of the first to Mth memory blocks BLK 0 to BLK M−1 in FIG. 4.

The first page (Page 0) of the kth memory block BLK k may be a valid area Valid capable of effectively writing data, the second page (Page 1) may be a free area, and the third page (Page 2) and the fourth page (Page 2) may be invalid areas InValid due to repeated data write/erase.

Similarly, the first page (Page 0) of the (k+1)th memory block BLK k+1 may be the valid area, and the second page (Page 1) and the fourth page (Page 3) may be the invalid areas, and the third page (Page 2) may be the free area. The first page (Page 0) and the second page (Page 1) of the (k+2)th memory block BLK k+2 may be the free areas, and the third page (Page 2) and the fourth page (Page 3) may be the valid area.

In response to the garbage collection signal GC, the garbage collection may be performed in the memory device 200 in FIG. 3 and data stored in the memory block BLK may be rearranged. Specifically, data stored in the first page (Page 0) of the (k+1)th memory block BLK k+1 may be copied to the second page (Page 1) of the (k+2)th memory block BLK k+2, and as a result, the data stored in the (k+1)th memory block BLK k+1 may not be significant. Therefore, the storage device 10 in FIG. 3 may make the entire (k+1)th memory block BLK k+1 writable again, by erasing the (k+1)th memory block BLK k+1. In other words, the garbage collection may be performed.

FIGS. 6, 7 and 8 are tables of data to be input to a GC policy generator according to an example embodiment of the inventive concept.

Table T1 in FIG. 6 will be referenced together with FIG. 3. The GC manager 320 in FIG. 3 may receive the first information INFO1. The first information INFO1 may be related to characteristics of data to be written to the memory device 200, such as data life time, performance, and continuity, and the first information INFO1 may include stream identifier (Stream ID), I/O sequentiality, performance, and valid page count (VPC).

The stream ID may be related to the essential characteristics of data, and may be assigned according to the data stream classified in the multistream manager 150 in FIG. 2. In an example embodiment, a sequential identifier may be assigned to a sequential stream that is a continuous data stream, and a random identifier may be assigned to a random stream that is a random data stream. Table T1 illustrates that at least eight stream identifiers such as stream IDs of 0, 3, and 7 are assigned, but they are not limited thereto.

I/O sequentiality may indicate the similarity of life time between adjacent data on the storage area, and quantification of continuity may be performed based on logical page number (LPN). LPN may be an internal data management size (e.g., 4 KB).

Performance may be an indicator used to determine whether the memory block is a hot block or a dynamic block, in which the currently processed data stream changes frequently, or a cold block or a static block, in which the currently processed data stream hardly changed, by calculating the data throughput and latency of the storage device 10.

The valid page count may refer to the number of pages that may effectively write data, or distribution information of pages. The valid page count may be used to select a victim memory block for generating a free memory block in which data are not written, while causing relatively little copy overhead.

A small number of valid page count may mean that the amount of data to be copied is small, so if the garbage collection using a greedy method is performed, block index 1 in table T1 may be the victim block of the garbage collection.

Table T2 in FIG. 7 will be referenced together with FIG. 3. The GC manager 320 in FIG. 3 may receive the second information INFO2. The second information INFO2 may be related to the state information of the memory device 200, the changed state information of the memory device 200 to be changed according to the written write data DATA, and the feature information of the write data DATA. The second information INFO2 may include the expected data life time, the expected block life time, the block open time, the free block count, and the like.

The expected data life time may mean a time elapsed after being written to the memory device 200 in FIG. 3. When the expected data life time is long, it may be interpreted that the data has not been erased or rewritten once it has been written, and thus the memory block in which the data has been written and has not changed may be understood as a cold block or the static block. That is, the expected data life time may be an index indicating the change characteristics of the data.

The expected block life time may be wear leveling information such as erase count, and may be the index required to select the victim block. When the expected block life time is long, it may mean that the erase is performed relatively little in the block, and thus it may be understood that the block has enough valid pages or free pages.

The block open time may be interpreted as erase to program interval (EPI) information, that is, a time elapsed after being erased and reprogrammed. In view of the recent technological trend of increasing the size of the block, the block open time may be a significant indicator for selecting the victim block.

The free block count may be an index counted in the GC manager 320 in FIG. 3. When the number of free blocks is equal to or greater than the threshold value, the storage device 10 in FIG. 3 may perform the write operation of data, and when the number of free blocks is less than the threshold value, the storage device 10 may perform the garbage collection.

Table T3 in FIG. 8 illustrates a data structure in which the table T1 in FIG. 6 and the table T2 in FIG. 7 are combined. Table T3 may be the table indicating input data of the GC policy generator 330, and may be a target for which the reinforcement learning is performed.

Figure 9:
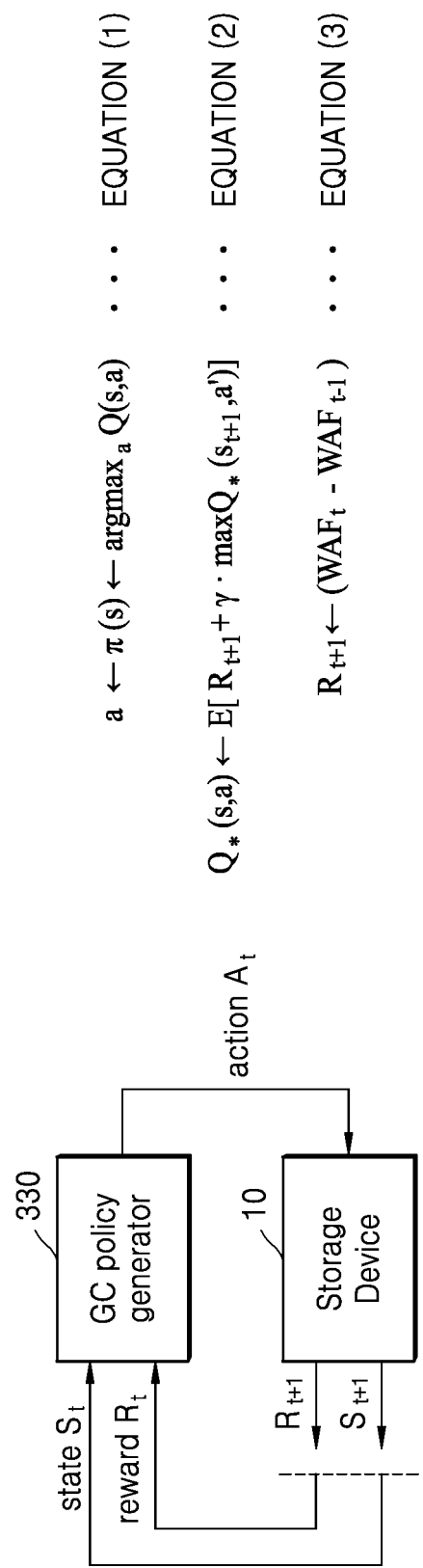
FIG. 9 is a model and equations used for policy determination to be performed in a GC policy generator according to an example embodiment of the inventive concept.

FIG. 9 illustrates equations used for policy determination to be performed in a GC policy generator according to an example embodiment of the inventive concept.

The feature information of all victim blocks and target blocks in the storage device 10 may be input to the GC policy generator 330 as a current state (state S t). The GC policy generator 330 may generate a vector for a value mapped to each action according to the state, and may select the action having the highest value as the policy according to the state. The value may be expressed as a probability value or an expected value. The GC policy generator 330 may provide the current action (action $A_t$) on the current state (state $S_t$) to the storage device 10. The storage device 10 may provide the current reward (reward $R_t$) on the current action (action $A_t$) to the GC policy generator 330. In addition, the storage device 10 may provide information about the next state (state $S_{t+1}$) to the GC policy generator 330, so that state provision, action, and reward may be continuously performed. The GC policy generator 330 may transmit and receive data with the reinforcement learning IP 160 of FIG. 2.

Learning about the values to be performed in the GC policy generator 330 may be performed based on Bellman equation. The Bellman equation may be a function that represents the relationship between value function of the current state and the value function of the next state, and may be an equation that calculates the reward according to the policy. Hereinafter, assume that Q-network is applied. In equation (1), the action a that yields the highest probability value on state s may be determined. Through the determined action a, the policy π (s) may be created with state s as a variable.

In order to assign the reward on the action, a temporal distance (TD) methodology (i.e., an N-step TD Learning) may be applied. In Equation (2), Q*(s, a) may mean the value mapped to the current state and the current action, and thus may calculate the next reward $R_{t+1}$. The next reward $R_{t+1}$ may be an expected value of a result of summing the discounted value of the maximum value among the values of the next state $s_{t+1}$ and the next reward $R_{t+1}$. Equation (3) may be a reward function. In equation (3), the next reward $R_{t+1}$ may be calculated as the amount of increase or decrease in WAF. Equation (3) may calculate the next reward $R_{t+1}$ by evaluating the action of the GC policy generator 330. When the WAF of the previous time is higher than the WAF of the current time, a positive reward may be received. Although the TD methodology is presented in FIG. 9 for convenience of description, but is not limited thereto, various algorithms that may enhance learning efficiency through the reward of techniques such as N-step TD and eligibility trace may be used.

Figure 10:
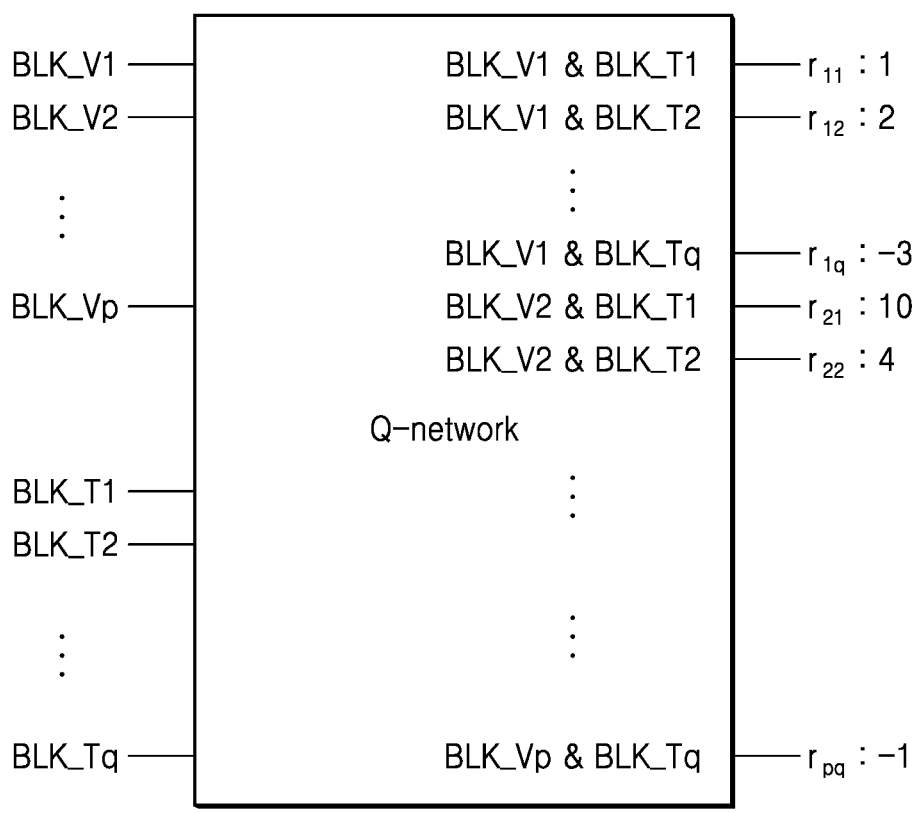
FIG. 10 is a block diagram illustrating a reinforcement learning algorithm to be performed in a GC policy generator according to an example embodiment of the inventive concept.

FIG. 10 is a block diagram illustrating a reinforcement learning algorithm to be performed in a GC policy generator according to an example embodiment of the inventive concept. FIGS. 3 and 10 are referenced together below for clarity.

FIG. 10 may show a model structure of the GC policy generator 330. Assume that the model structure is Q-network.

Data to be input for performing the reinforcement learning may include p victim candidate blocks (BLK_V1 to BLK_Vp) and q target candidate blocks (BLK_T1 to BLK_Tq), and as a result of the reinforcement learning, expected values $r_{11}$ to $r_{pq}$ may be calculated. The victim candidate blocks and the target candidate blocks may be all memory blocks BLK in the memory device 200 in FIG. 3. In an example embodiment, a first expected value r11 may be calculated as a result of the combination of the first target candidate block and the first target candidate block, and a (p×q)th expected value $r_{pq}$ may be calculated (p and q are natural numbers). The Q-network may output the highest expected value among the first expected value to the (p×q)th expected value. According to the example of FIG. 10, $r_{11}$ is 1, $r_{12}$ is 2, $r_{1q}$ is −3, $r_{21}$ is 10, $r_{22}$ is 4, and $r_{pq}$ is −1. Accordingly, according to the highest expected value $r_{21}$, the second victim block BLK_V2 may be selected as a garbage collection victim block and the first target block BLK_T1 may be selected as a garbage collection target block.

As the model for the reinforcement learning, it is illustrated in FIG. 10 that the Q-network is used, but this is for convenience of description, and various networks may be used to perform the reinforcement learning.

Figure 11:
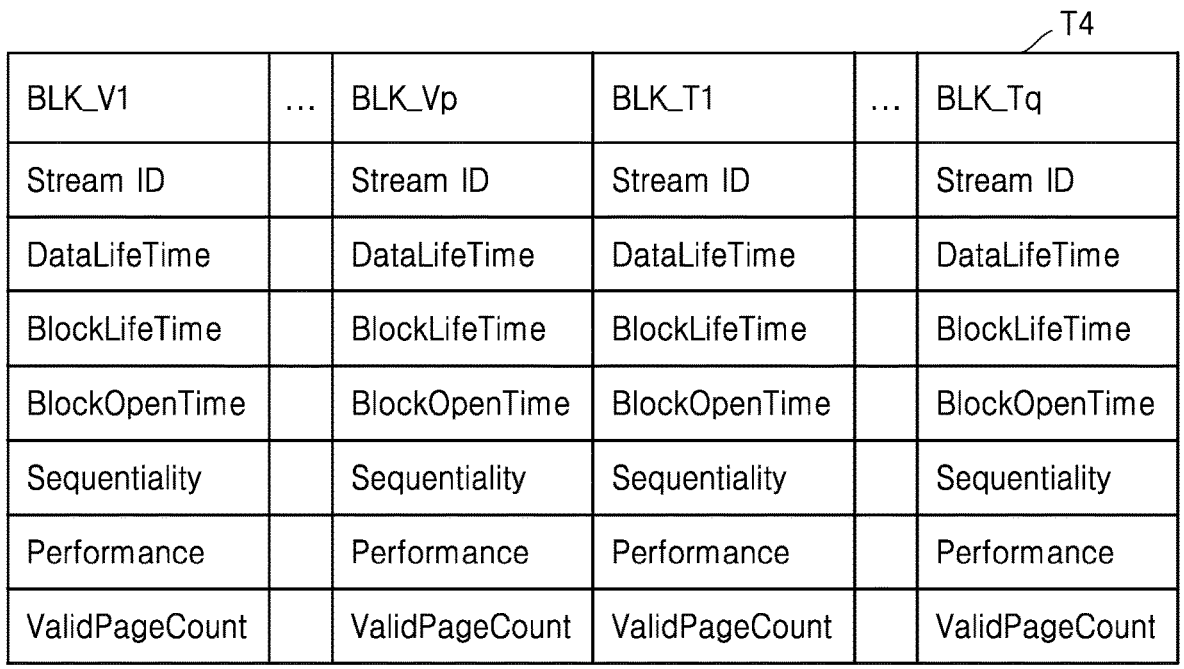
FIG. 11 is a table of data to be input to a GC policy generator according to an example embodiment of the inventive concept.

FIG. 11 is a table of data to be input to a GC policy generator according to an example embodiment of the inventive concept.

The characteristics of write data DATA included in the first information INFO1 and the second information INFO2 to be received by the GC policy generator 330, the state information of the memory device 200, and the state information of the memory device 200 changed according to the written write data DATA are shown in Table T3 of FIG. 8. When the table T3 of FIG. 8 is interpreted in the view of the block, the victim blocks BLK_V1 to BLK_Vm and the target blocks BLK_T1 to BLK_Tn may respectively include the indicator such as stream ID, input/output sequentiality, performance, valid page count, expected data life time, expected block life time, and block open time.

For example, the table T4 may represent the state information of the GC policy generator 330 in FIG. 3, and may include data characteristics of the victim block and the target block.

Figure 12:
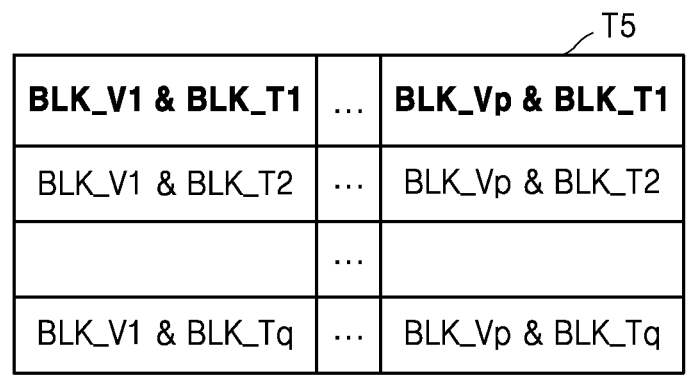
FIG. 12 is a table of data to be output from a GC policy generator according to an example embodiment of the inventive concept.

FIG. 12 is a table of data to be output from a GC policy generator according to an example embodiment of the inventive concept.

Table T5 may represent the action for maximizing an expected value of the reward given on the state that is data input to the GC policy generator 330. The GC policy generator 330 in FIG. 3 may perform the action of listing the number of all cases in which any one of the plurality of victim blocks and any one of the plurality of target blocks is combined.

Figure 13:
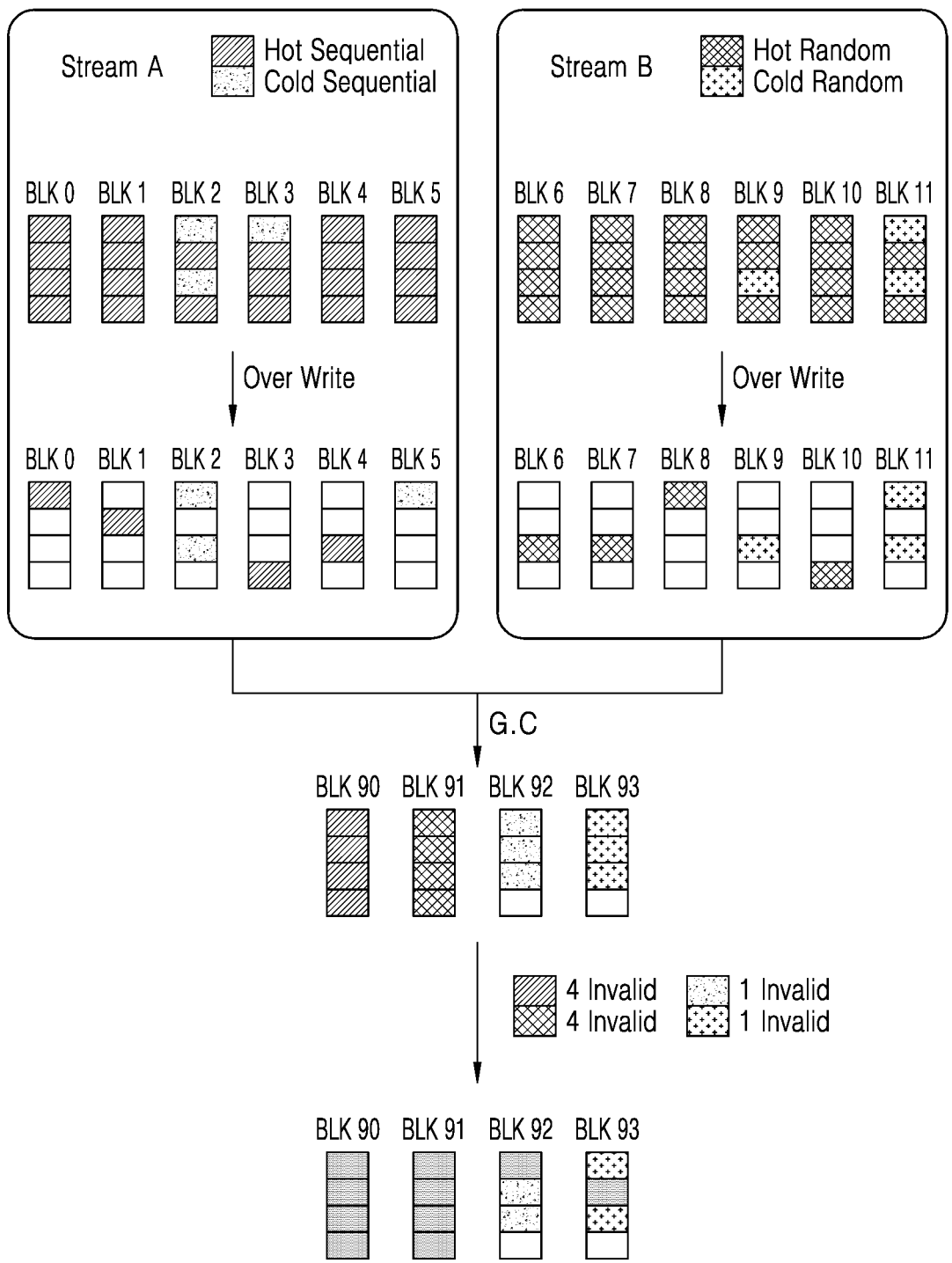
FIG. 13 is a conceptual diagram illustrating garbage collection to be performed in a storage device according to an example embodiment of the inventive concept.

FIG. 13 is a conceptual diagram illustrating garbage collection to be performed in a storage device according to an example embodiment of the inventive concept. FIGS. 2 and 13 are referenced together below for clarity.

As the multi-stream manager 150 of FIG. 2 operates, the first to sixth memory blocks BLK 0 to BLK 5 may be classified as a sequential stream (Stream A) having continuous data stream characteristics, and the right memory block BLK 6 to BLK to 11 may be classified as a random stream (Stream B) having random data stream characteristics. The first to sixth memory blocks BLK 0 to BLK 5 and the seventh to twelfth memory blocks BLK 6 to BLK 11 may be some of the plurality of blocks BLK 0 to BLK M−1 in FIG. 4.

The data streams may include hot data whose data is frequently changed and cold data whose data is not frequently changed, according to characteristics of data. The cold data may be less likely to be cause a block to become an invalid block, because the cold data has fewer repetitions of deletion and writing than the hot data. When the cold data is scattered in the memory block BLK, fragmentation of data may be caused.

When overwriting is performed on the memory blocks BLK 0 to BLK 11, data already written may be erased (e.g., by the page where the data was stored being designated as invalid) and data may be written again (to a free page in a different block or in the same block). At this time, blocks that may not be erased cleanly (e.g., blocks with one or more invalid pages but which have not been fully erased) may occur depending on the characteristics of the data. For example, as invalid pages within a block exist, generation of the free block may be suppressed. FIG. 13 illustrates memory blocks BLK 0 to BLK 11 that may not be erased cleanly (e.g., fully) as the overwriting is performed. Therefore, the garbage collection operation may be required.

According to the inventive concept, as a result of performing the reinforcement learning according to the characteristics of data and the state information of the memory device 200 in FIG. 3, the garbage collection may be performed for data having similar data characteristics. Specifically, the victim block may be selected from the victim candidate blocks and the target block may be selected from the target candidate blocks, so that data sharing similar characteristics are written in the same target block.

As data having similar data characteristics are written to the same memory block, data may be erased cleanly in the subsequent garbage collection or erase operation, and thus more free blocks may be generated. The generation of free blocks may result in a reduction in the number of performing the garbage collection, or a reduction in WAF.

The garbage collection selecting memory blocks BLK 0 to BLK 11 that are not erased cleanly as the victim blocks and memory blocks BLK 90 to BLK 93 as the target blocks may be performed.

In an example embodiment, hot sequential data may be collected in block BLK 90, hot random data in block BLK 91, cold sequential data in block BLK 92, and cold random data in block BLK 93, respectively. That is, data having similar data characteristics to each other may be collected in the blocks BLK 90 to BLK 93. As a result, the blocks BLK 90 and BLK 91 may be free blocks through the erase operation.

More specifically, for the sequential stream of Stream A, since the first block BLK 0, the second block BLK 1, the fourth block BLK 3, and the fifth block BLK 4 share the characteristics of hot sequential data, pages in the first block BLK 0, the second block BLK 1, the fourth block BLK 3, and the fifth block BLK 4 may be stored in the 91th block BLK 90 together. Since the third block BLK 2 and the sixth block BLK 5 share the characteristic of cold sequential data, pages in the third block BLK 2 and the sixth block BLK 5 may be stored in the 93th block BLK 92 together.

Likewise, for the sequential stream of Stream B, pages in accordance with the hot random data in the blocks 7th, 8th, 9th, and 11th (BLK 6, 7, 8, and 10) may be stored in the 92th block BLK 91 together, and pages in accordance with the cold random data in the blocks 10th and 12th, BLK 9 and 11 may be stored in the 94th block BLK 93 together.

Since data sharing the same characteristics are collected in one place, the data may be erased cleanly through the erase operation, and the garbage collection may not be repeated.

Figure 14:
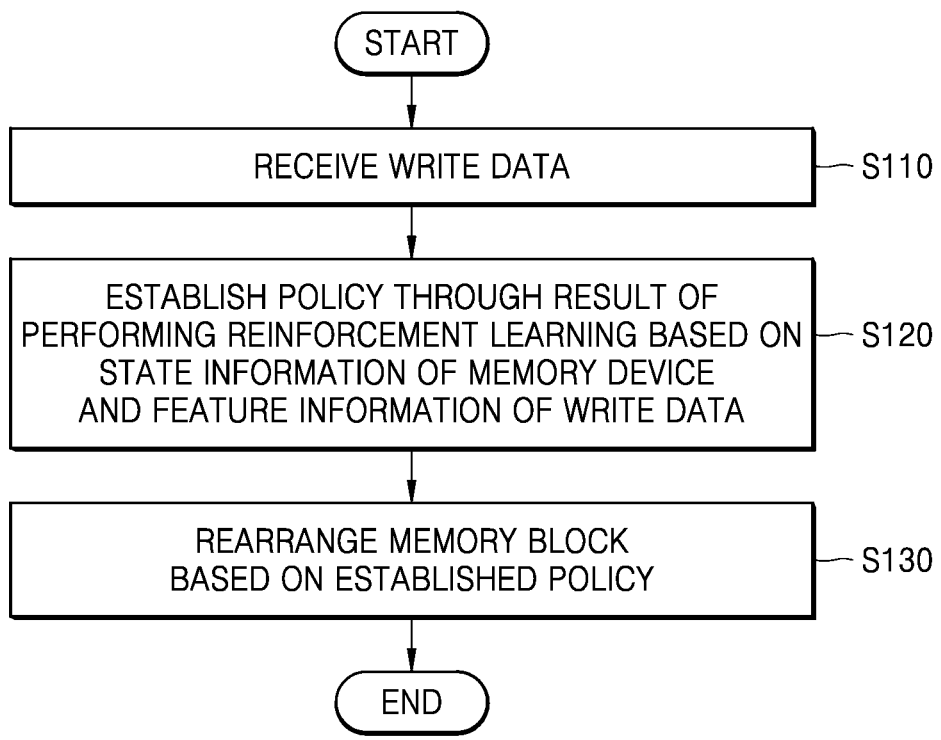
FIG. 14 is a flowchart illustrating an operating method of a memory controller according to an example embodiment of the inventive concept.

FIG. 14 is a flowchart illustrating an operating method of a memory controller according to an example embodiment of the inventive concept. FIGS. 3 and 14 will be referenced together below for clarity.

The storage device 10 may receive write data from the host (S110).

The memory controller 100 may perform the reinforcement learning based on at least one of the state information of the memory device 200 and the feature information of write data DATA, and as a result, the policy for selecting one combination of the victim block and target block among a plurality of combinations of the victim block and target block may be established (S120). The memory device 200 may perform an operation of rearranging the memory blocks BLK according to the established policy, that is, the garbage collection, in response to the garbage collection GC signal from the memory controller 100 (S130).

Figure 15:
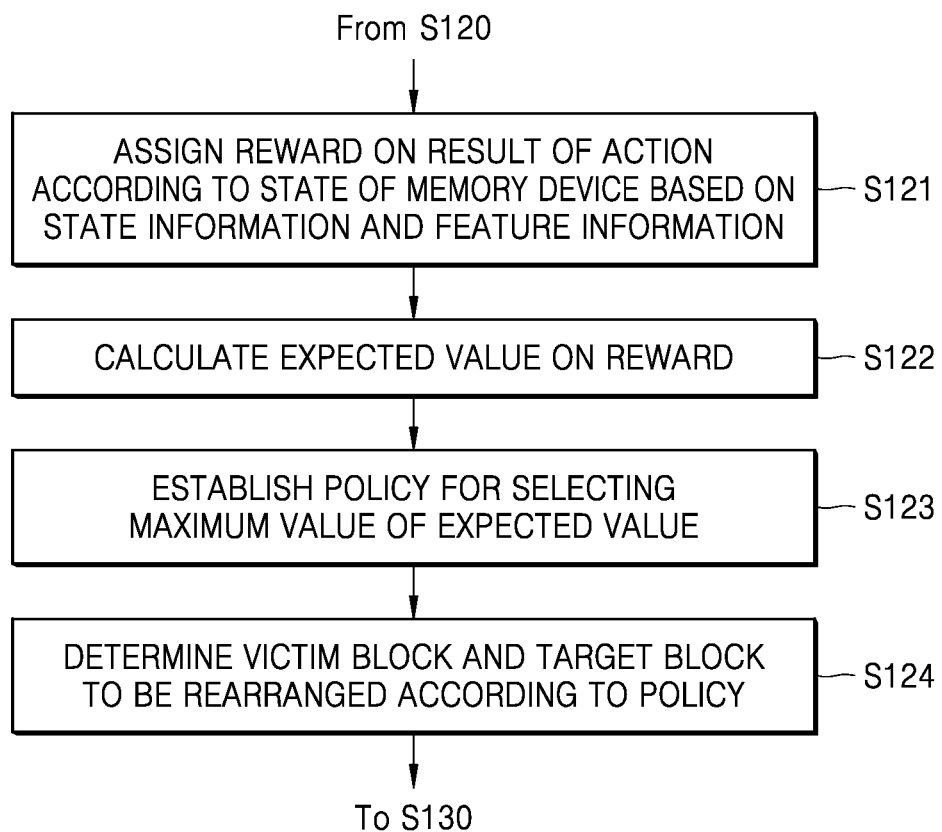
FIGS. 15 and 16 are flowcharts illustrating an operating method of a memory controller according to an example embodiment of the inventive concept.
Figure 16:
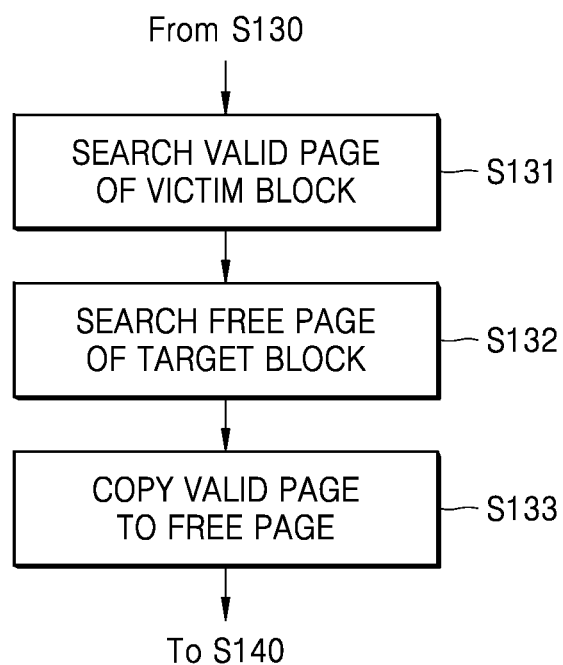

FIGS. 15 and 16 are flowcharts illustrating an operating method of a memory controller according to an example embodiment of the inventive concept, in more detail. FIGS. 3, 15, and 16 will be referenced together below for clarity.

According to FIG. 15, after the policy is established (S120), the GC policy generator 330 of the memory controller 100 may assign the reward on a result of the action according to the state of the memory device 200 based on the state information and the feature information (S121). The GC policy generator 330 may calculate an expected value on the reward (S122) and select a maximum value of the expected value, thereby establishing the policy for selecting an output having the highest expected value (S123). The GC policy generator 330 may determine the victim block BLK_V and target block BLK_T to be rearranged according to the policy (S124).

According to FIG. 16, in the step of performing the garbage collection, a valid page may be searched by accessing the determined victim block BLK_V (S131), and a free page may be searched by accessing the determined target block BLK_T (S132). Thereafter, the memory device 200 may copy data stored in the valid page to the free page (S133), whereby the garbage collection may be performed.

Figure 17:
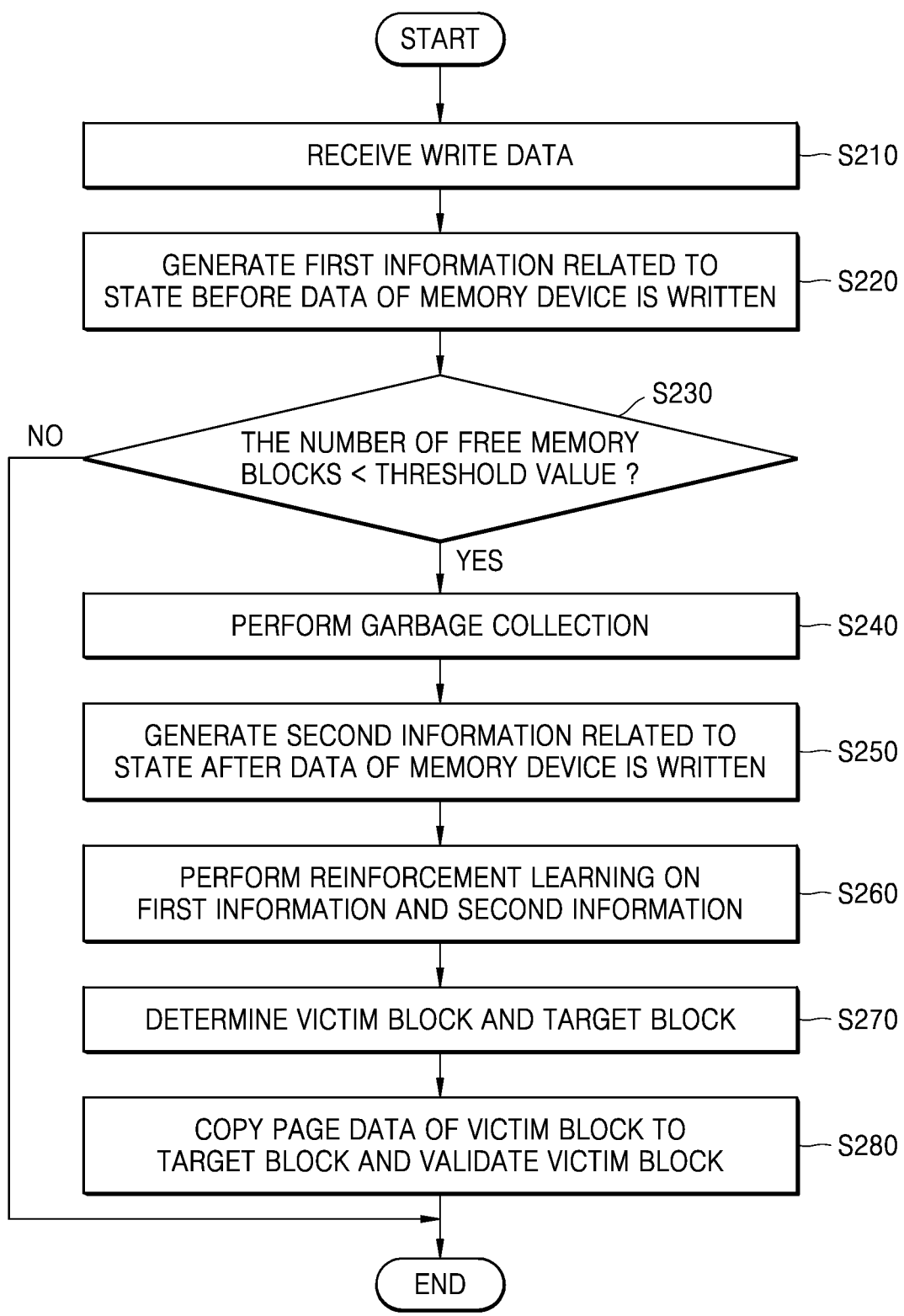
FIG. 17 is a flowchart illustrating an operating method of a memory controller according to an example embodiment of the inventive concept.

FIG. 17 is a flowchart illustrating an operating method of a memory controller according to an example embodiment of the inventive concept. FIGS. 3 and 17 will be referenced together below for clarity.

The input/output unit 310 may receive write data from the host (S210). The input/output unit 310 may generate the first information INFO1 related to the feature information on the write data DATA or the state before the data of the memory device 200 is written (S220). The number of free memory blocks may be compared to the threshold value (S230). The input/output unit 310 may perform the garbage collection when the number of free memory blocks is less than the threshold value (S240).

Thereafter, the memory device 200 may generate the second information INFO2 related to the feature information on the write data DATA or the state after the data of the memory device 200 is written (S250). The GC policy generator 330 may perform the reinforcement learning on the first information INFO1 and the second information INFO2 (S260). As a result, the victim block BLK_V and the target block BLK_T may be determined (S270). The memory device 200 may copy page data of the victim block BLK_V to the target block BLK_T and validate the victim block by performing the erase operation on the victim block (S280).

Figure 18:
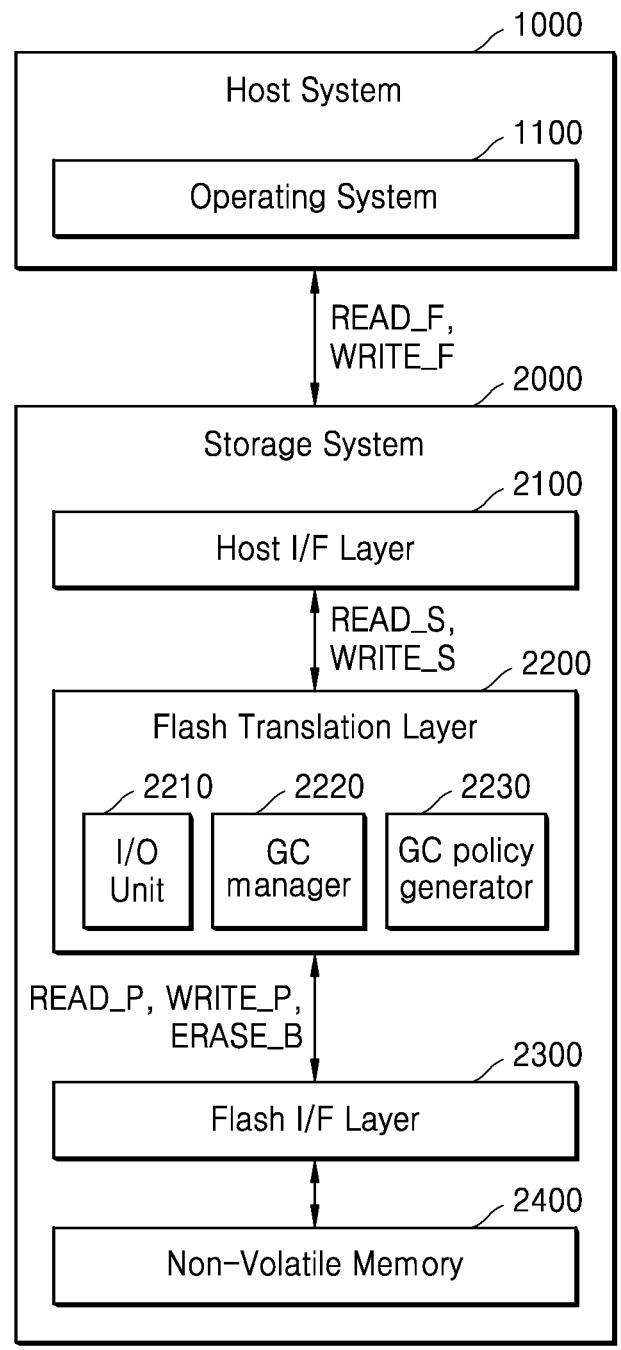
FIG. 18 is a block diagram illustrating a memory system according to an example embodiment of the inventive concept.

FIG. 18 is a block diagram illustrating a memory system according to an example embodiment of the inventive concept.

The host system 1000 and the storage system 2000 may constitute the memory system 1. As an example embodiment, the memory system 1 may constitute a computer, an ultra mobile PC (UMPC), a workstation, a net-book, a personal digital assistants (PDA), a portable computer, and a web tablet, a tablet computer, a wireless phone, a mobile phone, a smart phone, an e-book, a portable multimedia player (PMP), a portable game machine, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage constituting data center, a device that may transmit and receive information in a wireless environment, one of a variety of electronic devices that make up a home network, one of a variety of electronic devices that make up a computer network, one of a variety of electronic devices that make up a telematics network, a radio frequency identification (RFID) device, or one of various components constituting a computing system.

The host system 1000 may include at least one operating system 1100, and the operating system 1100 may manage and control the functions and operations of the host as a whole and provide interaction between a user using the memory system 1 and the host.

Here, the operating system 1100 may support functions and operations corresponding to the user's purpose and purpose of use, and may be divided into, for example, a general operating system and a mobile operating system according to the mobility of the host. In addition, the operating system 1100 may be divided into a personal operating system and an enterprise operating system according to the user's usage environment. For example, the personal operating system may be a specialized system to support a service provision function for the user and include windows, chrome, and the like and the enterprise operating system may be a specialized system to secure and support high performance and include windows server, linux, unix, and the like.

The operating system 1100 may be a system characterized to support mobility service providing functions and power saving functions of the system to users, and may include Android, iOS, Windows mobile, and the like. In an example embodiment, the host may include a plurality of operating systems, and also execute the operating system to perform operations with the memory system 1 corresponding to the user request, where the host may transmit a plurality of commands corresponding to the user request to the memory system 1, and therefore, the memory system 1 may perform operations corresponding to the commands, that is, operations corresponding to the user request.

The read and write requests of the host system 1000 may be performed in file unit. That is, data may be stored in the storage system 2000 from the host system 1000 or data stored in the storage system 2000 may be read to the host system 1000, through file read READ_F request or file write WRITE_F request.

The storage system 2000 may be implemented as, for example, a personal computer (PC), a data server, a network-attached storage (NAS), an Internet of Things (IoT) device, or a portable electronic device. The portable electronic device may include a laptop computer, a mobile phone, a smart phone, a tablet PC, a personal digital assistant (PDA), an enterprise digital assistant (EDA), a digital still camera, a digital video camera, an audio device, a portable multimedia player (PMP), a personal navigation device (PND), an MP3 player, a handheld game console, an e-book, a wearable device, or the like.

The storage system 2000 may include a host interface layer 2100, a flash translation layer 2200, a flash interface layer 2300, and a non-volatile memory 2400.

The host interface layer 2100 may include a logical area in which interfacing between the host system 1000 and the storage system 2000 may occur.

The flash translation layer 2200 may be understood as another form of the FTL 300 of FIG. 3, the input/output unit 2210 may correspond to the input/output unit 310 of FIG. 3, the GC manager 2220 may correspond to the manager 320 of FIG. 3, and the GC policy generator 2230 may correspond to the GC policy generator 330 of FIG. 3, and duplicate description is omitted.

The host interface layer 2100 and the flash translation layer 2200 may write or read data in sector unit. That is, according to the read/write request of the host system, the host interface layer 2100 may request the read/write request for each sector to the flash translation layer 2200.

The flash interface layer 2300 may provide interfacing between the flash translation layer 2200 and the non-volatile memory 2400. According to an example embodiment, read data READ_P and write data WRITE_P may be performed in page unit, but erase data ERASE_B may be performed in block units.

The non-volatile memory 2400 may be understood as the memory device 200 of FIG. 3, and redundant descriptions are omitted.

The memory system 1 according to the inventive concept may be mounted by using various types of packages. For example, the memory system 1 according to the inventive concept may be mounted in the form of package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flatpack (TQFP), small outline (SOIC)), shrink small outline package (SSOP), thin small outline (TSOP), system in package (SIP), multi chip package, or the like.

While the inventive concept has been particularly shown and described with reference to embodiments thereof, it will be understood that various changes in form and details may be made therein without departing from the spirit and scope of the following claims.

What is claimed is:

1. A storage device comprising:
a memory device comprising a plurality of memory blocks; and
a memory controller configured to
control a garbage collection operation of the memory device,
select a victim block and a target block for performing the garbage collection operation among the plurality of memory blocks, according to state information of each of the plurality of memory blocks and feature information of data written in each of the plurality of memory blocks, by using a reinforcement learning model that includes selecting one action that maximizes a reward based on a write amplification factor (WAF), wherein the WAF is calculated based on a ratio of data requested by a host to data written to the memory device, and
provide an address, a command, and a control signal to the memory device based on the selected victim block and the selected target block,
wherein data stored in the plurality of memory blocks are rearranged based on the provided address, the command, and the control signal, and
wherein the memory controller includes
a garbage collection (GC) manager configured to determine whether to perform the garbage collection operation, and
a GC policy generator that selects the victim block and the target block by using the reinforcement learning model and outputs the control signal to the selected victim block and the selected target block to the GC manager.

2. The storage device of claim 1, wherein the memory controller further comprises an input/output unit configured to generate the feature information of write data received from the host and output the generated feature information to the GC manager.

3. The storage device of claim 1, wherein the GC manager performs the garbage collection operation when the number of free memory blocks capable of writing data is less than a threshold value.

4. The storage device of claim 1, wherein each of the plurality of memory blocks comprises at least one page, and
the memory device copies a valid page of the victim block to a free page of the target block based on a garbage collection signal received from the memory controller.

5. The storage device of claim 1, wherein each of the plurality of memory blocks comprises at least one page, and
the state information comprises at least one of: the number of valid pages among pages of the plurality of memory blocks, a performance of the memory device, expected life times of the plurality of memory blocks, and erasing elapsed times of the plurality of memory blocks.

6. The storage device of claim 1, wherein the feature information comprises at least one of: an expected life time of data input from the host, a continuity of the data input from the host, a multistream identifier (ID) assigned according to a use frequency of the data.

7. The storage device of claim 1, wherein the memory controller further comprises a multistream manager configured to classify data input from the host according to a use frequency.

8. The storage device of claim 1, wherein the victim block and the target block are selected based on a ratio of data requested by the host to data actually written to the memory device.

9. A storage device comprising:
a memory device comprising a plurality of memory blocks; and
a memory controller configured to control the memory device and perform garbage collection by performing reinforcement learning that includes selecting one action that maximizes a reward based on a write amplification factor (WAF), based on first information indicating a state of the memory device before writing data and second information indicating a state of the memory device after writing data, and to include
a host interface for interfacing between a host and the memory controller; and
a flash interface for interfacing between the memory controller and the memory device,
wherein the WAF is calculated based on a ratio of data requested by the host to data written to the memory device,
wherein the garbage collection includes rearranging data stored in the plurality of memory blocks, and
wherein the memory controller includes
a garbage collection (GC) manager configured to determine whether to perform the garbage collection, and
a GC policy generator that selects a victim block and a target block by using the reinforcement learning model and outputs the control signal to the selected victim block and the selected target block to the GC manager.

10. The storage device of claim 9, wherein each of the plurality of memory blocks comprises at least one page, and
the first information comprises at least one of: the number of valid pages among pages, a performance of the memory device, a continuity of data input from the host, and a multistream identifier (ID) assigned according to a use frequency of the data.

11. The storage device of claim 9, wherein the second information comprises at least one of: an expected life time of data input from the host, an expected life time of the memory block, and an erasing elapsed time of the memory block.

12. An operating method of a memory controller, the operating method comprising:
receiving write data;
establishing a policy as a result of performing reinforcement learning that includes selecting one action that maximizes a reward based on a write amplification factor (WAF), based on state information of a memory device;
determining, by a garbage collection (GC) manager, whether to perform a garbage collection operation based on the policy; and selecting, using a GC policy generator, a victim block and a target block by using the reinforcement learning model and outputting the control signal to the selected victim block and the selected target block to the GC manager based on the policy,
wherein the WAF is calculated based on a ratio of data requested by a host to data written to the memory device.

13. The operating method of claim 12, wherein the establishing a policy comprises:
assigning the reward for a result of an action according to a state based on the state information;
calculating an expected value of the reward; and
establishing the policy based on a maximum value of the expected value.

14. The operating method of claim 13, wherein the reward is assigned based on a ratio of data requested by the host to data actually written to the memory device.

15. The operating method of claim 12, wherein the establishing a policy comprises determining the victim block and the target block according to the policy.

16. The operating method of claim 15, wherein each of the victim block and target block comprises at least one page, and the garbage collection operation comprises:
searching for a valid page of the victim block;
searching for a free page of the target block; and
copying the valid page to the free page.

17. The operating method of claim 12, further comprising:
comparing the number of free memory blocks of the memory device capable of writing the write data to a threshold value; and
performing the garbage collection operation when the threshold value is greater than the number of free memory blocks.

18. The operating method of claim 12, further comprising:
generating first information indicating a state before writing data among the state information; and
generating second information indicating a state after writing data among the state information.

19. The operating method of claim 18, wherein the establishing a policy comprises performing the reinforcement learning based on the first information and the second information.

* * * * *